United States Patent [19]
Johnson et al.

[11] Patent Number: 4,947,293
[45] Date of Patent: Aug. 7, 1990

[54] CARGO VEHICLE PERIMETER CLEARANCE LIGHTING SYSTEM

[76] Inventors: Glenn M. Johnson, 1146 Longwood Ave., Los Angeles, Calif. 90019; Derek R. Gallardo, 9594½ West Olympic Blvd., Beverly Hills, Calif. 90212

[21] Appl. No.: 318,709

[22] Filed: Mar. 3, 1989

[51] Int. Cl.⁵ .............................................. F21Y 8/00
[52] U.S. Cl. ....................................... 362/32; 362/61; 362/74
[58] Field of Search ...................... 362/32, 61, 80, 74, 362/330, 328

[56] References Cited

U.S. PATENT DOCUMENTS

| | | | |
|---|---|---|---|
| 2,198,443 | 4/1940 | Paul et al. | 362/32 |
| 2,479,500 | 8/1949 | Longberg | 240/2 |
| 2,704,321 | 3/1955 | Orlansky | 240/7.7 |
| 2,791,678 | 5/1957 | Ferman | 240/8.1 |
| 2,808,502 | 10/1957 | Large | 240/8.2 |
| 3,005,089 | 10/1961 | Robbins | 362/61 |
| 3,723,722 | 3/1973 | Van Iderstine et al. | 240/7.7 |
| 3,761,706 | 9/1973 | Frey | 362/32 |
| 3,854,438 | 12/1974 | Soto | 116/28 R |
| 4,561,043 | 12/1985 | Thompson | 362/32 |
| 4,613,927 | 9/1986 | Brandt | 362/32 |
| 4,740,870 | 4/1988 | Moore | 362/32 |
| 4,763,984 | 8/1988 | Awai et al. | 350/96.24 |
| 4,811,171 | 3/1989 | Viola | 362/32 |
| 4,816,968 | 3/1989 | Yamada et al. | 362/32 XV |

FOREIGN PATENT DOCUMENTS 660223  3/1963  Canada ................................. 362/74

*Primary Examiner*—Stephen F. Husar
*Assistant Examiner*—Richard R. Cole
*Attorney, Agent, or Firm*—Harvey S. Hertz; William T. O'Neil

[57] ABSTRACT

A trailer or semi-trailer cargo container body clearance lighting system including a core light conducting material in the form of an elongated light-conducting strip clad about its cross-section with a translucent material layer having an index of refraction different from that of the core material to produce a light guide. The core and cladding are constructed to support lower and higher modes of light transmission and thereby provide lateral light emission as well as longitudinal propagation. A light source with light focusing reflectors is adapted to end-illuminate light guides for both sides of a container body from a single light source.

3 Claims, 2 Drawing Sheets

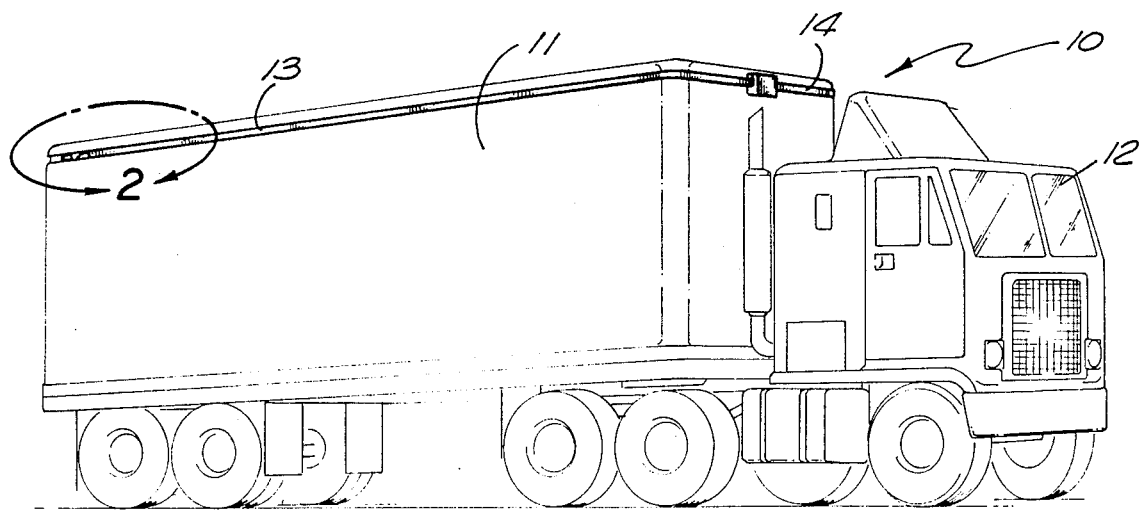
FIG 1
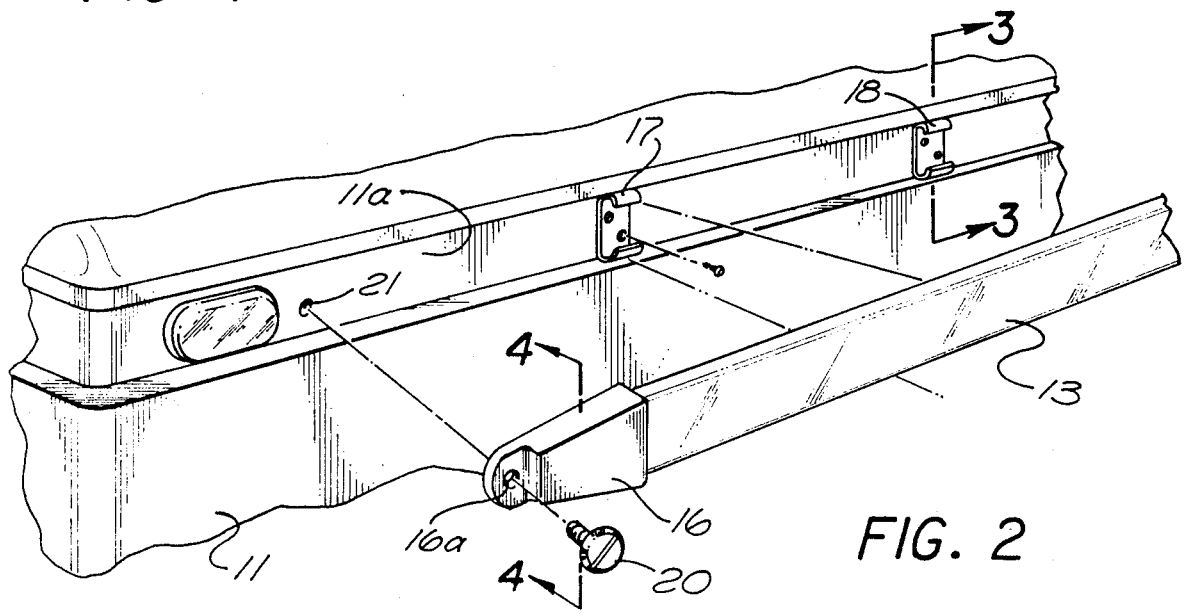
FIG. 2
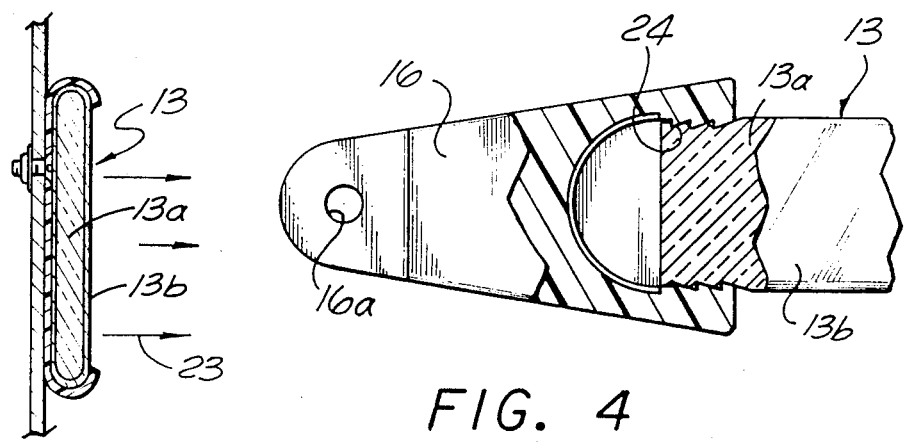
FIG. 3
FIG. 4

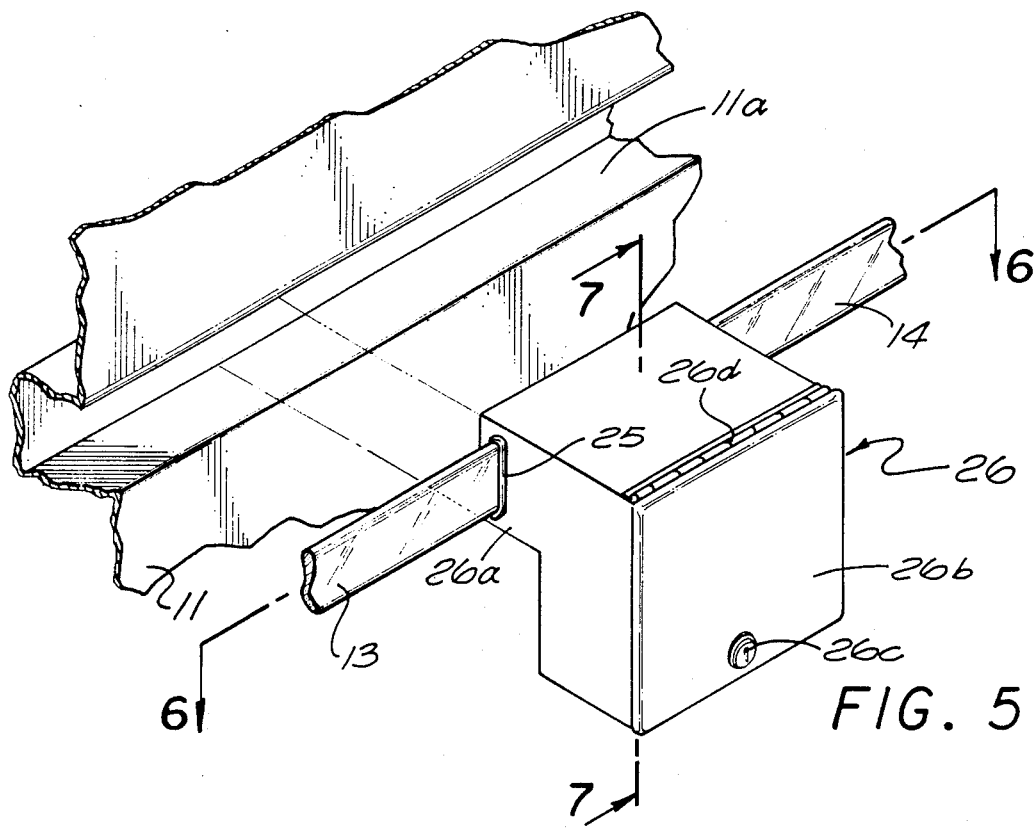
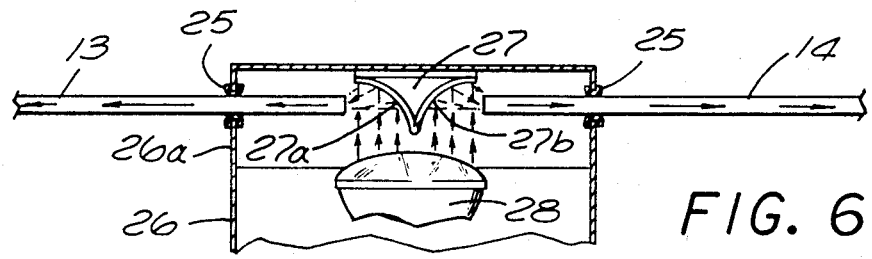
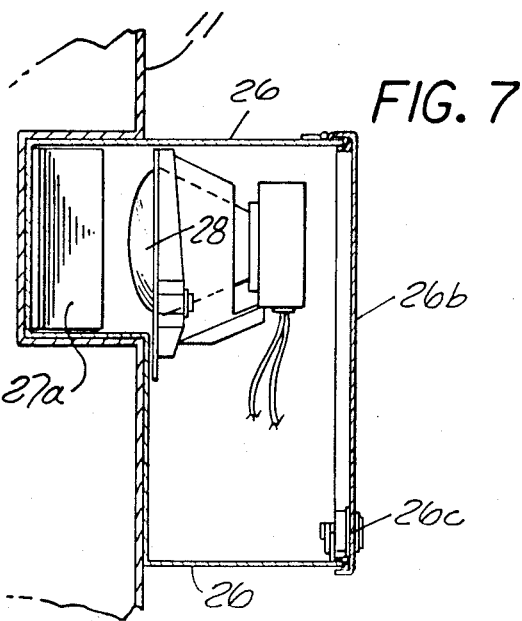
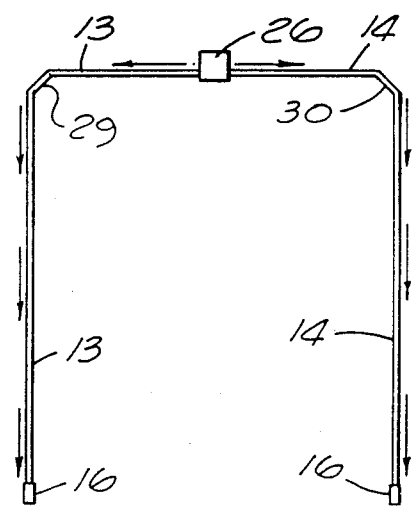
FIG. 5
FIG. 6
FIG. 7
FIG. 8

CARGO VEHICLE PERIMETER CLEARANCE LIGHTING SYSTEM

BACKGROUND OF THE INVENTION

1. Field of the Invention

The invention relates generally to apparatus for continuous strip illumination along the top edge of the perimeter of the vehicle body, and, more specifically, to a continuously illuminated clearance light strip arrangement along that perimeter.

2. Description of the Prior Art

Highway cargo vehicles of the semi-trailer or full trailer type are conventionally constructed as separate chassis units with container bodies mounted thereon and are pulled by tractor units. Vehicles codes uniformly prescribe brake, clearance and turn signal light locations and light colors. Every container body of the type includes an indentation or trough about at least a portion of the body perimeter adjacent to the roof line of the body for placement of clearance and other required lights. Conventionally, the lights placed therein are prior art units including incandescent lamps.

The light strips employed in the novel combination are emplaced horizontally within the container body trough along at least a portion of the perimeter of the container body such that lateral visibility is provided.

The light strips employed in the novel combination are constructed in accordance with optic fiber principles. Light transmission from an energizing source must travel longitudinally within the strips but also must emit, more or less uniformly, laterally. The use of fiber optic structures to convey light longitudinally and at the same time provide the needed lateral emission is known in the prior art. U.S. Pat. No. 4,763,984 discloses an arrangement including a plurality of optic fibers extending in lateral juxtaposition in a plane. The enhanced lateral light flux emission thereby provides the appearance of an illuminated strip.

In such an arrangement various techniques may be employed to enhance the required lateral emission. In the usual fiber optics arrangement light signal conveyance is optimized to provide longitudinal light transmission with a minimum of lateral emission, the latter being regarded as undesired leakage. For that purpose, the optical fiber core and cladding are constructed in accordance with well known criteria to provide light flux propagation in lower order and fundamental modes resulting in very little lateral emission. In the present combination, however, both the longitudinal transmission and lateral emission are desired. The aforementioned U.S. Pat. No. 4,763,984 describes some methods and structural variations in respect to optic fiber core size, etc. for effecting the desired lateral light emission along with sufficient longitudinal propagation. Those criteria are generally applicable to the structure of the invention although very significant structural differences vis-a-vis the prior art are included in the novel combination. These novelties will be described as this specification proceeds.

Other known prior art disclosing uses of lateral emissions from an end-energized light guide includes U.S. Pat. Nos. 2,479,500 and 2,808,502. Other prior art showing various uses of "light pipes" for various purposes includes U.S. Pat. Nos. 2,704,321; 3,723,722; 3,854,438; and 4,740,B70. None of the known prior art discloses, or makes obvious, the novel combination of the invention.

SUMMARY OF THE INVENTION

It may be said to have been the general object of the invention to provide an inexpensive and easily manufactured and installed light strip, light guide particularly for insertion into a cargo vehicle body indentation to provide improved clearance lighting.

The invention relies on known optical fiber design principles which provide light propagation within a flat strip light guide in lower and also higher modes to afford both longitudinal travel and lateral emission from a novel light guide structure. That structure includes a flat strip of light transmissive material, the broad lateral surface of which provides the lateral emission desired. That strip is the monolithic core of the light guide structure and is encased in a cladding of a translucent material having an index of refraction differing from that of the core. The physical configuration of the core and cladding is relied upon to produce lower and higher mode light propagation therein for the purpose of the device.

The details of a typical embodiment according to the invention are set forth in the detailed Description hereinafter.

BRIEF DESCRIPTION OF THE DRAWINGS

FIG. 1 is a pictorial view of a typical semi-trailer and tractor cargo vehicle with the clearance lighting apparatus in place.

FIG. 2 is a detail of a typical trough (elongated indentation) adjacent to the container body (semi-trailer) roof line, with exploded view of the light guide structure according to the invention.

FIG. 3 is a sectional view of the light guide taken along the line 3—3 of FIG. 2.

FIG. 4 is a partially cut-away view of the light guide end anchoring means.

FIG. 5 is a pictorial view illustrating placement of the light source box at the front end of the container box in relations to a pair of light guide members extending therefrom.

FIG. 6 illustrates the interior structure of the light source box of FIG. 5 in section taken along the line 6—6 of FIG. 5.

FIG. 7 illustrates another sectional view of the interior of the light source box taken along the line 7—7 of FIG. 5.

FIG. 8 is a horizontal layout of a typical cargo container body light guide layout according to FIG. 1.

DETAILED DESCRIPTION

Referring to FIG. 1, a semi-trailer cargo vehicle 10 including chassis mounted container body 11 and tractor unit 12 is shown. Light guides 13 and 14 are shown recessed into the conventional elongated indentation within the container body adjacent to the roof thereof and are secured by a plurality of clips, typically 17 and 18. In FIG. 2, this elongated indentation is shown at 11a. The light guide on this side of the body 11 is terminated in a cap 16 which is secured within the indentation (recess) 11a by a screw 20 through mounting hole 16a and into threaded opening 21.

In FIG. 3 the light guide 13 will be seen to be configured as a substantially flat core member 13a with cladding 13b to produce light flux propagation along the length of light guide 13 as well as lateral emission illustrated by arrows 23. Although there are various materials suitable for the core 13a and the cladding 13b, a polyfilimer material with transparent (or at least translucent) polytetrafluoroethylene cladding as manufactured by Luminite Corp. of Chatsworth, Calif. provides the appropriate combination of refractive indices to establish the light propagation modes which will result in the desired longitudinal light flux propagation and lateral emission through the cladding 13b when the light guide is end illuminated.

FIG. 4 illustrates a way of anchoring the light guide. A cap member 16 has a bore with interval barbs 24 for gripping the light guide as it is inserted therein.

Turning now to FIG. 5, a pictorial representation shows the light source enclosure 26 having a forward portion 26a which fits into the elongated indentation 11a to facilitate end illumination of both light guides 13 and 14 while they are seated within indentation 11a. The clad light guides 13 and 14 project from the enclosure through openings with sealing grommets, typically 25. Enclosure 26 has a cover plate 26b hinged at 26d and has a securing screw at 26c.

Sectional views taken as indicated on FIG. 5 are depicted in FIG. 6 and FIG. 7. A double concave reflector 27 has a first concave reflective surface 27a for concentrating (focusing) light flux from light source 28 onto the inward end of light guide 13. Concave surface 27b similarly reflects light form source 28 onto the corresponding end of light guide 14. FIG. 7 shows that surface 27a, and for that matter 27b, concentrates the light in a vertical line since the inward ends of light guides 13 and 14 lie in a substantially vertical plane.

FIG. 8 shows a plan view of light guides 13 and 14 associated with light source enclosure 26.

The light guides employed in the combination described afford simple installation and are commercially available. The flexibility of this form of light guide facilitates corner bends at 29 and 30 (FIG. 8), resulting in ease of installation. Moreover, the light guides employed are much more economically fabricated than light guides formed of a plurality of optical fibers of circular cross section.

In FIG. 2, a mandatory rear side light 22 is shown and is conventional in all respects. Light 22 is of a color prescribed by vehicle regulations and is no more than 18 inches from the rear of the container body. Illumination according to the invention is not normally provided on the rear of the container body whose full height access doors are normally provided. Only the light source 28 requires electrical wiring, a further factor in simplifying installation on a cargo vehicle body.

The light guides 13 an 14 are readily fabricated to laterally emit a specified light color by coloration of the polytetrafluorethylene cladding 13b.

Modifications and variations within the scope of the inventive concept will suggest themselves to those of skill in this art. Accordingly, it is not intended that the scope of the invention be limited to the specific details depicted in the drawings or described in this specification, these being intended to be typical and illustrative only.

What Is Claimed Is:

1. In a highway cargo vehicle including at least one chassis mounted container body drawn by a tractor unit, said container body having a standard elongated recessed indentation extending adjacent to a roof line of said body, the combination comprising:

at least one light guide in strip form mounted within said elongated indentation, said light guide having a solid core of polyfilimer material having a first index of refraction and a cladding being composed of polytetrafluorethylene having a second index of refraction, said light guide being of generally rectangular cross-section mounted with a broad side of said cross-section facing outward;

means for illuminating one end of said light guide over said cross-section;

and mode forming means associated with said light guide including the physical cross-sectional dimensions of said light guide and a predetermined ratio of said first and second indices of refraction thereby effecting longitudinal light flux propagation within said light guide and lateral light flux emission from said outward facing broad side of said light guide.

2. The system according to claim 1 in which said cladding is colored to produce corresponding coloring of said laterally emitted light.

3. The combination according to claim 1 in which said illuminating means is mounted along a forward end of said vehicle body and two of said light guides are connected therefrom and formed to bend around forward corners of said vehicle and thence formed around sides of said vehicle body to provide said clearance lighting.

* * * * *